(12) United States Patent
Hetzel

(10) Patent No.: US 12,221,172 B2
(45) Date of Patent: Feb. 11, 2025

(54) STEERING SYSTEM

(71) Applicant: Robert Bosch GmbH, Stuttgart (DE)

(72) Inventor: Oliver Hetzel, Waldstetten (DE)

(73) Assignee: Robert Bosch GmbH, Stuttgart (DE)

( * ) Notice: Subject to any disclaimer, the term of this patent is extended or adjusted under 35 U.S.C. 154(b) by 848 days.

(21) Appl. No.: 17/425,259

(22) PCT Filed: Dec. 7, 2019

(86) PCT No.: PCT/EP2019/084102
§ 371 (c)(1),
(2) Date: Jul. 22, 2021

(87) PCT Pub. No.: WO2020/164774
PCT Pub. Date: Aug. 20, 2020

(65) Prior Publication Data
US 2022/0119034 A1     Apr. 21, 2022

(30) Foreign Application Priority Data
Feb. 14, 2019 (DE) .................... 10 2019 201 933.1

(51) Int. Cl.
*B62D 5/04* (2006.01)
(52) U.S. Cl.
CPC ......... *B62D 5/0424* (2013.01); *B62D 5/0448* (2013.01)
(58) Field of Classification Search
CPC .................... B62D 5/0424; B62D 5/0448
See application file for complete search history.

(56) References Cited

U.S. PATENT DOCUMENTS

| 2010/0319471 A1* | 12/2010 | Nam ....................... F16H 25/24 |
| | | 74/89.23 |
| 2012/0061164 A1* | 3/2012 | Budaker .............. B62D 5/0448 |
| | | 74/89.36 |

(Continued)

FOREIGN PATENT DOCUMENTS

| CN | 1755169 A | 4/2006 |
| CN | 1993574 A | 7/2007 |

(Continued)

OTHER PUBLICATIONS

International Search Report corresponding to PCT Application No. PCT/EP2019/084102, mailed Mar. 27, 2020 (German and English language document) (6 pages).

*Primary Examiner* — Jacob D Knutson
*Assistant Examiner* — Abigail R Hymel
(74) *Attorney, Agent, or Firm* — Maginot, Moore & Beck LLP

(57) ABSTRACT

A steering system includes a steering rod mounted for longitudinal axial sliding in a housing and a steering motor acting on the steering rod via a ball screw drive, for which the steering rod forms a ball recirculation screw thread, which interacts with a transmission nut that can be driven by the steering motor. A transmission wheel of a flexible transmission, by means of which driving power of the steering motor is transmitted to the transmission nut, is untiltably connected to an inner ring of a rotary bearing. The transmission nut is pivotably mounted on the transmission wheel about an arbitrary pivot axis, which is oriented perpendicularly to the longitudinal axis of the steering rod. The transmission nut, which is pivoted as a result of a flexural load on the steering rod, can be decoupled from the rotary bearing and from a tensile load on the transmission wheel.

12 Claims, 3 Drawing Sheets

(56) References Cited

U.S. PATENT DOCUMENTS

| | | | | |
|---|---|---|---|---|
| 2015/0251689 A1* | 9/2015 | Tajima | ................. | B62D 5/0448 |
| | | | | 180/444 |
| 2017/0096165 A1* | 4/2017 | Bae | ...................... | B62D 5/0448 |
| 2018/0009464 A1* | 1/2018 | Kim | ...................... | F16C 35/067 |

FOREIGN PATENT DOCUMENTS

| | | | | | |
|---|---|---|---|---|---|
| CN | 103635713 | A | | 3/2014 | |
| CN | 103889823 | A | | 6/2014 | |
| CN | 106536325 | A | | 3/2017 | |
| DE | 102011117723 | A1 | * | 5/2013 | ........... B62D 5/0424 |
| DE | 10 2011 056 031 | A1 | | 6/2013 | |
| DE | 10193475 | B3 | * | 12/2013 | ........... B62D 5/0427 |
| DE | 10 2016 119 367 | A1 | | 4/2018 | |
| WO | 2015/169735 | A1 | | 11/2015 | |

\* cited by examiner

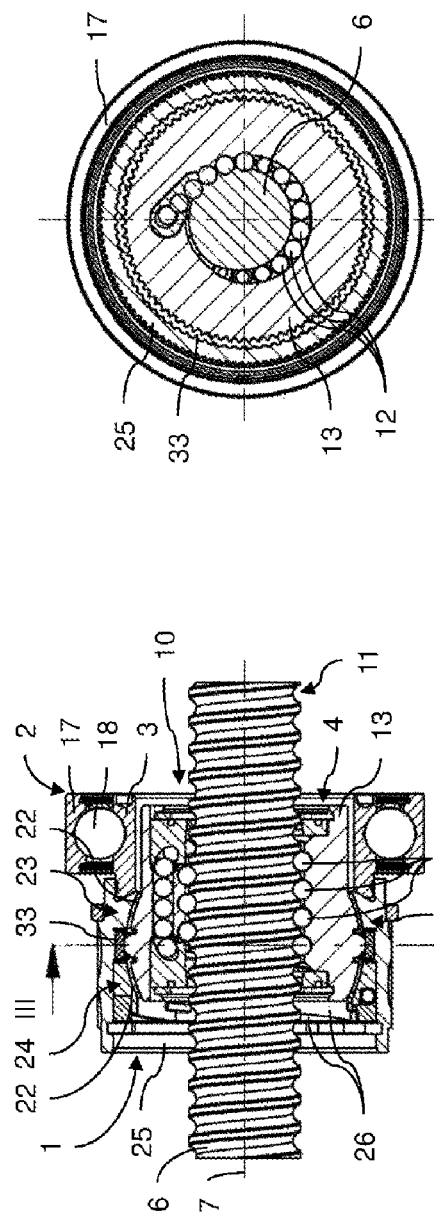
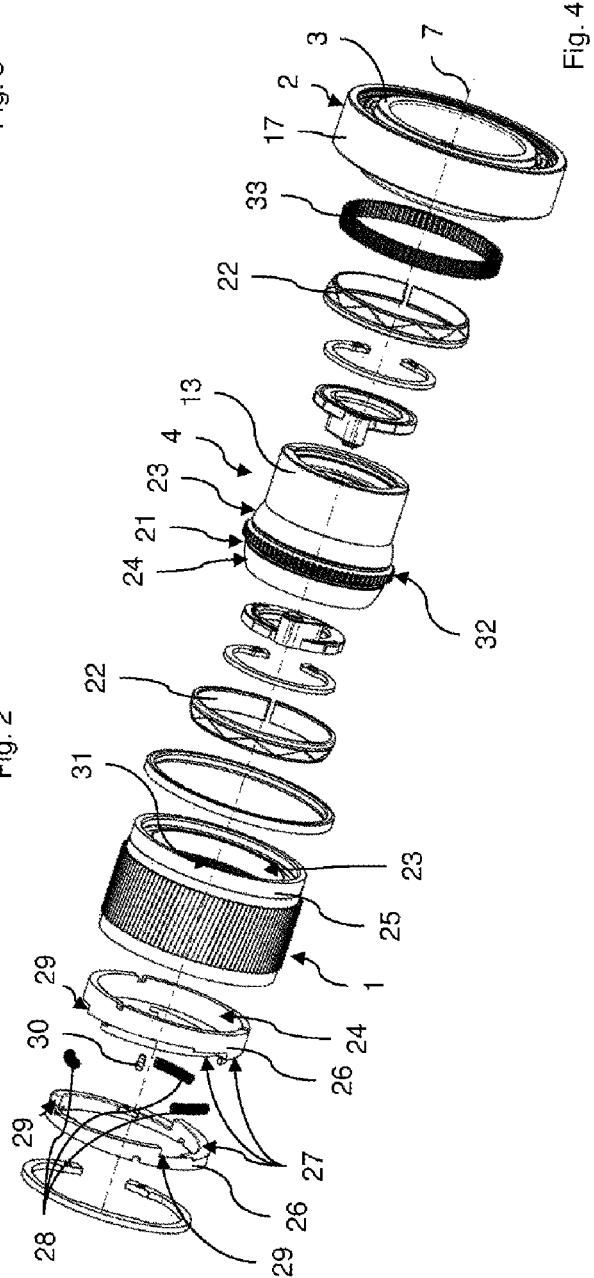

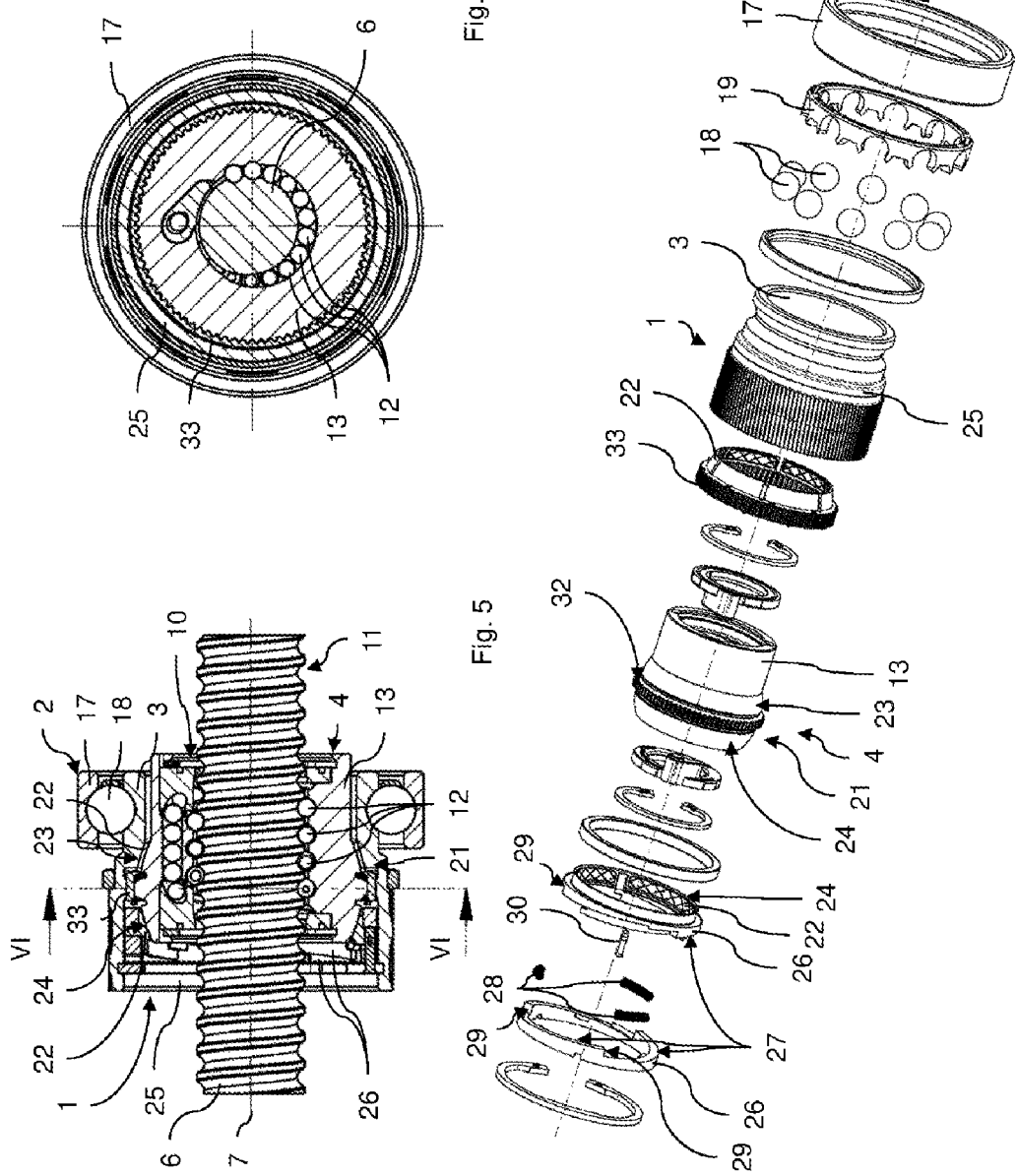

STEERING SYSTEM

This application is a 35 U.S.C. § 371 National Stage Application of PCT/EP2019/084102, filed on Dec. 7, 2019, which claims the benefit of priority to Serial No. DE 10 2019 201 933.1, filed on Feb. 14, 2019 in Germany, the disclosures of which are incorporated herein by reference in their entirety.

The disclosure relates to a steering system comprising a steering rod, which is mounted displaceably in a longitudinal axial direction in a housing, and comprising a steering motor, which acts on the steering rod via a ball screw drive, for which purpose the steering rod forms a ball recirculation screw thread in at least one portion, which ball recirculation screw thread interacts with a transmission nut, which can be driven by the steering motor, wherein the transmission nut is mounted rotatably in the housing by means of a bearing assembly.

BACKGROUND

A ball bearing in the form of a four-point contact ball bearing is often used for the rotatable mounting of the transmission nut of the ball screw drive. Such a four-point contact ball bearing is then usually installed rigidly on the transmission nut or the bearing inner ring is integrated in the transmission nut. A four-point contact ball bearing is usually used because it must transfer significant axial forces in the steering system.

To transfer the driving torque of the steering motor, belt drives are often used. In this case, a belt wheel of the belt drive is often rigidly connected to the transmission nut of the ball screw drive. The belt tension is thus supported primarily via the ball screw drive.

In order to avoid, where possible, the undesirable generation of noise when a motor vehicle comprising a corresponding steering system turns (steering direction change) and travels over rough road surfaces, the four-point contact ball bearing of such a steering system is usually designed with a relatively small axial play. If the axial play of the four-point contact ball bearing were too great, the balls of the four-point contact ball bearing would be accelerated so strongly as a result of the free axial play during turning maneuvers that they would generate an impact noise when they strike against the opposite raceway flank. The solution, to design the four-point contact ball bearing of such a steering system with a relatively small axial play, often fails to function well enough, however, and therefore corresponding steering systems tend to be noisy.

Furthermore, when assembling such a steering system, the ball screw drive is stressed by component tolerances of the individual components. This stress on the ball screw drive results in a relatively high friction in the ball screw drive, which may result in irregularities in the displacement force of the ball screw drive.

In order to minimize stresses on the ball screw drive when assembling the steering system, spring elements are used, which for example are arranged on the outer ring of the four-point contact ball bearing. These spring elements may additionally have the task of supporting the ball screw drive flexibly, so as to minimize any transverse loads on the ball screw drive, said transverse loads resulting from the deflection and angling of tie rods of the steering system that are connected to the steering rod. The tilt angle to be achieved with a structural design of this kind, however, is usually insufficient to protect the ball screw drive against damage resulting from high transverse forces which are transferred from the tie rods to the steering rod. In addition, an undesirable generation of noise from the four-point contact ball bearing during turning maneuvers often cannot be kept sufficiently low by means of the spring elements.

Document WO 2015/169735 A1 describes a ball screw drive for a steering system of a motor vehicle, in which the transmission nut is received in a joint ring, the lateral surface of which is also formed in a manner running in a curved fashion in relation to its longitudinal direction, wherein this longitudinally axially curved lateral surface of the joint ring contacts the inner face of the inner ring of a ball bearing used to rotatably support the transmission nut. In this case, the inner face of the inner ring is provided in at least one portion with a curvature corresponding to the curvature of the joint ring in the longitudinal axial direction, whereby the joint ring and the inner ring of the ball bearing form a pivot bearing which allows the transmission nut to pivot about any pivot axes oriented radially to the longitudinal axis of the transmission nut. In the steering system according to WO 2015/169735 A1, a transmission wheel, formed as a ring gear, of a belt drive is additionally connected to the inner ring of the ball bearing.

SUMMARY

The object of the disclosure was to avoid the discussed problems as easily as possible and as effectively as possible in a steering system comprising a ball screw drive.

This object is achieved by means of a steering system as described in detail below. Advantageous embodiments of the steering system according to the disclosure will emerge from the following description of the steering system.

In accordance with the disclosure, a steering system is provided which has at least one steering rod, which is mounted displaceably in a longitudinal axial direction in a housing, and a steering motor, wherein the steering motor acts on the steering rod via a ball screw drive, for which purpose the steering rod forms a ball recirculation screw thread in at least one portion, which ball recirculation screw thread interacts with a transmission nut, which can be driven by the (preferably electric, possibly also hydraulic) steering motor. The transmission nut is mounted here rotatably within the housing by means of a bearing assembly. Furthermore, a transmission wheel of a traction drive, for example of a toothed belt drive, by means of which driving power of the steering motor can be transferred to the transmission nut, is connected in a tilt-proof and also rotationally conjoint manner to an inner ring of a rotary bearing of the bearing assembly, which is preferably in the form of a rolling bearing. Furthermore, the transmission nut is mounted on the transmission wheel such that the transmission nut can pivot about a (in particular about any) pivot axis which is oriented perpendicularly to the longitudinal axis of the steering rod.

In the present context, the expression "tilt-proof" is understood to mean that a tilting of the transmission wheel about an arbitrary or any tilt axis positioned perpendicularly to its longitudinal axis is transferred to the inner ring of the rotary bearing.

Because of such a design of a steering gear, in which a pivot bearing ensuring the pivotability of the transmission nut is formed on the transmission wheel and not on the rotary bearing itself, the transmission nut, which is pivoted as a result of a corresponding flexural load on the steering rod, can be decoupled from the rotary bearing, and thus several advantages can be achieved. One of these advantages is an automatic elimination of play of the rotary bearing, allowing undesired noise generation to be avoided or reduced. This automatic elimination of play of the rotary bearing is based on the tilt-proof attachment of the transmission wheel to the inner ring of the rotary bearing in conjunction with the decoupling, also provided by the embodiment according to the disclosure of the steering system, of the rotary bearing from pivot movements of the transmission nut, said decoupling being realized by the forming of the pivot bearing on the transmission wheel. The bearing play and in particular axial play of the rotary bearing may be eliminated in this way, specifically by the tensile load of the traction drive acting on the transmission wheel, since this tensile load leads to a slight tilting of the inner ring of the ball bearing, decoupled from pivot movements of the transmission nut.

Furthermore, as a result of the embodiment according to the disclosure of a steering system, the transmission nut can be decoupled from a tensile load on the transmission wheel of the traction drive, which has a positive effect with regard to achieving the most optimal possible and in particular also uniform frictional resistance in the relative movements of the ball screw drive.

At the same time, the construction of a steering system according to the disclosure can be of a relatively simple design and thus robust, in spite of these achievable advantages.

In accordance with a preferred embodiment of a steering system according to the disclosure, it may be provided that the transmission wheel is designed as a transmission ring gear and the transmission nut has a curved, preferably part-spherically curved joint portion, which interacts, to form a pivot bearing, with a curved, preferably likewise part-spherically curved joint portion which is formed at least in part, possibly fully, by the transmission wheel. In particular, an embodiment of the steering system can thus be realized in which the steering gear of the steering system, i.e. the unit of those components by means of which driving power is transferred from the steering motor to the steering rod, is realized as a particularly compact embodiment at least in respect of the extension along the longitudinal axis of the steering rod.

It may furthermore preferably be provided that a plain bearing layer is arranged between the joint portion of the transmission nut and the joint portion of the transmission wheel, whereby the transmission nut may be pivoted relative to the transmission wheel in the smoothest possible manner. This plain bearing layer may preferably be designed in the form of a separate component, in particular a component made of plastic (for example made of PTFE or comprising PTFE). Such a plain bearing layer has a particularly advantageous effect if, as is fundamentally preferred, the transmission nut and/or the transmission wheel are/is formed from metal preferably fully, but at least in the regions forming the curved joint portions.

It may furthermore preferably be provided that the joint portion of the transmission nut and/or the joint portion of the transmission wheel are/is acted on elastically in such a way that play-free (direct or indirect) contact is established between the joint portions. An automatic setting and readjustment for the pivot bearing may thus be provided, so that this pivot bearing has as little play as possible at all times, i.e. also after a relatively long period of operation of the steering system, which has an advantageous effect in respect of the steering behavior and also in respect of the generation of noise during operation of the steering system.

Such an elastic loading of the joint portion of the transmission nut and/or of the joint portion of the transmission wheel may be realized in a structurally advantageous manner in that a first sub-portion of the joint portion of the transmission nut and/or a first sub-portion of the joint portion of the transmission wheel is displaceable axially in relation to the longitudinal axis of the steering rod relative to an (a respectively) associated second sub-portion and is loaded by means of a biased loading device.

The loading device may furthermore preferably have a first ring element (which possibly forms the first or second sub-portion itself) and a second ring element, wherein said ring elements each have an end face which is formed at least in some portions as a slanted face (oriented obliquely relative to a radial plane), wherein the slanted faces of the two ring elements contact one another directly or indirectly, and wherein the ring elements are loaded by means of at least one biased spring element in such a way that they would, in principle, perform a relative rotation (about their longitudinal axes). Such elastic loading of the joint portion of the transmission nut and/or of the joint portion of the transmission wheel is, on the one hand, of relatively simple design and thus robust. Furthermore, it is characterized by relatively compact dimensions, in particular along the directions defined by the longitudinal axis of the steering rod. Furthermore, an advantageous spring characteristic curve may be realized in this way for the elastic loading, since the spring elements are able to act in the circumferential direction of the ring elements. By way of such an orientation of the spring elements, a relatively large amount of installation space may be provided for their integration, whereby a relatively large number of spring elements and/or relatively long spring elements may be used.

In order to avoid an undesirable shifting of such a loading device as a result of forces that are transferred from the steering rod to the transmission nut, it may furthermore preferably be provided that the slanted faces have gradient angles in relation to a radial plane that are less than or equal to 7°.

In order to provide a direct transfer of driving power of the steering motor from the transmission wheel, which is part of the traction drive, to the transmission nut, it may be provided in accordance with a preferred embodiment of a steering system according to the disclosure that the transmission wheel is connected to the transmission nut in a rotationally conjoint manner, i.e. in a torque-transferring manner, by means of a coupling. The coupling is designed here in such a way that it ensures the pivotability about the pivot axis/axes oriented perpendicularly to the longitudinal axis of the steering rod, in spite of the rotationally conjoint connection.

A coupling that advantageously satisfies these requirements has a toothing, the teeth of which are oriented parallel to the longitudinal axis of the steering rod. The teeth are preferably realized here with curved tooth heads and/or with curved tooth flanks, so that the coupling is then designed in the form of what is known as a curved-tooth coupling.

In order to provide minimal play and also minimal operating noise of such a toothed coupling, it may preferably be provided that the coupling has a toothed intermediate ring, which interacts both with an inner toothing of the transmission wheel and also with an outer toothing of the transmission nut and which is preferably formed from plastic. An embodiment of the toothed intermediate ring from plastic may be expedient in particular if both the transmission wheel and the transmission nut are made of metal (i.e. one or more metals) at least in the regions forming the toothings.

An integration of the coupling that is advantageous in particular in respect of the dimensions but also in respect of the function may be achieved in that the coupling is arranged (preferably centrally) between a first sub-portion and a second sub-portion of the joint portion of the transmission nut and/or of the joint portion of the transmission wheel. With a corresponding embodiment of the steering system, these sub-portions may preferably be those sub-portions that are displaceable relative to one another and are loaded by means of a biased loading device.

In accordance with a preferred embodiment of a steering system according to the disclosure, it may furthermore be provided that the transmission nut is arranged with a defined radial play (i.e. with a defined distance over the entire circumference of the transmission nut) within the inner ring of the rotary bearing. The radial play may preferably be selected to be of such a size that contact between the transmission nut and the inner ring is avoided in all slanted positions between these components that are expected or that occur during normal operation of the steering system. The partial arrangement of the transmission nut within the inner ring of the rotary bearing allows a compact embodiment of the steering gear of the steering system along with a relatively large length of the transmission nut, which in turn has an advantageous effect in respect of the magnitude of the driving power transferrable by means of the ball screw drive. The radial play ensures, in spite of this arrangement, the decoupling of the rotary bearing from pivoting movements of the transmission nut that is desired in accordance with the disclosure.

The (preferably sole) rotary bearing of the bearing arrangement of a steering system according to the disclosure may advantageously be a single-row ball bearing, in particular a four-point contact ball bearing (according to DIN 628), which, in spite of its suitability for transferring relatively high axial forces, allows a relatively economical embodiment of the steering system.

The attachment of the transmission wheel to the inner ring of the rotary bearing in a tilt-proof and preferably also rotationally conjoint manner may be realized on the one hand in that these are formed in one part, i.e. constituting the same component. It is also possible that these are formed as separate components and are connected to one another accordingly.

The steering system according to the disclosure may preferably be designed as a power steering system and may thus allow a manually generated steering torque, transferred to a steering gear via a steering handle (for example a steering wheel) and preferably with intermediate positioning of a steering column, to have superimposed thereon a steering torque generated by the steering motor in order to reduce (possibly occasionally even to zero) the amount of steering torque necessary for steering and to be manually generated. The steering gear may comprise, in particular, a steering pinion, which interacts with a toothing formed by the steering rod in one portion.

The steering system may, on the other hand, also be designed such that the steering motor always provides the entire driving power necessary for steering.

The disclosure also relates to a motor vehicle, in particular a wheel-based and not rail-mounted motor vehicle, preferably a passenger car or truck, comprising a steering system according to the disclosure.

The indefinite article ("a" or "an"), in particular in the patent claims and in the description explaining the patent claims generally, shall be understood as such, and not as numerals. Accordingly, components specified in this way shall thus be understood in the sense that they are provided at least once and may be provided in multiple.

BRIEF DESCRIPTION OF THE DRAWINGS

The disclosure will be explained in greater detail hereinafter on the basis of embodiment examples shown in the drawings, in which:

FIG. 2: shows a partial longitudinal section through an assembly, which comprises a steering rod, a ball screw drive, a mounting for the ball screw drive and a transmission wheel, for a steering system according to the disclosure in accordance with a second embodiment;

FIG. 3: shows a cross section through the assembly according to FIG. 2 along the plane of section III-III in FIG. 2;

FIG. 4: shows an exploded illustration of the assembly according to FIGS. 2 and 3, but without the steering rod;

FIG. 5: shows a partial longitudinal section through an assembly, which comprises a steering rod, a ball screw drive, a mounting for the ball screw drive and a transmission wheel, for a steering system according to the disclosure in accordance with a third embodiment;

FIG. 6: shows a cross section through the assembly according to FIG. 5 along the plane of section VI-VI in FIG. 5; and FIG. 7: shows an exploded illustration of the assembly according to FIGS. 5 and 6, but without the steering rod.

DETAILED DESCRIPTION

Figure 1:
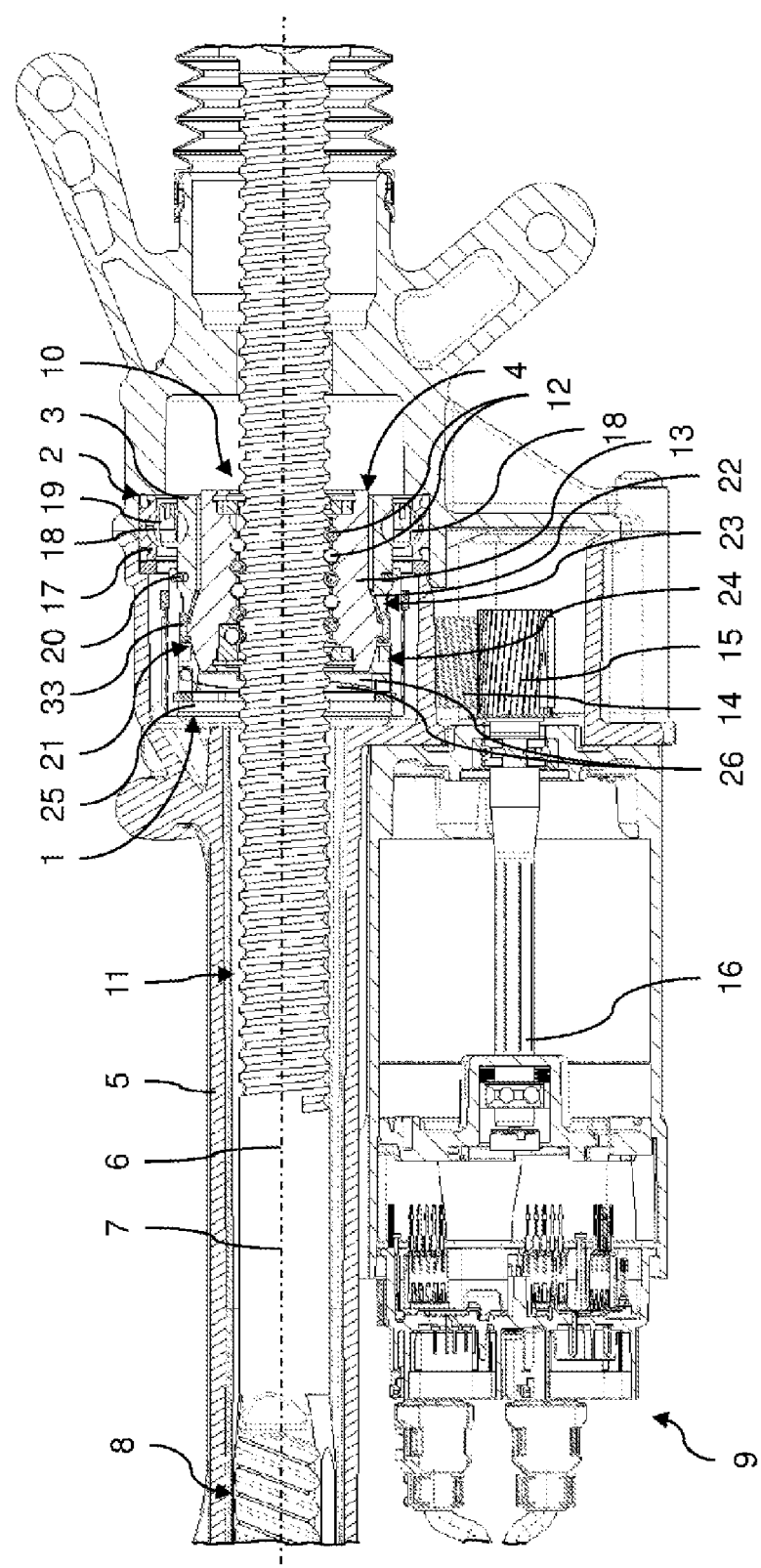
FIG. 1: shows a portion of a steering system according to the disclosure in accordance with a first embodiment in a partial longitudinal section.

FIG. 1 shows a first embodiment of a steering system according to the disclosure which is designed as a power steering system. FIGS. 2 to 4 on the one hand and FIGS. 5 to 7 on the other hand each show an assembly which comprises a plurality of components of a steering system according to the disclosure, as is shown in principle in FIG. 1. The three steering systems still to be explained with reference to the drawings differ here fundamentally merely in respect of the specific structural designs that are provided in order to achieve a tilt-proof and rotationally conjoint attachment of a (first) transmission wheel 1 of a belt drive of the steering system in question to an inner ring 3 of a rotary bearing 2 of the steering system in question, and also in respect of the design of a pivot bearing in question, which allows a transmission nut 4 to be pivoted within the (first) transmission wheel 1.

The steering systems each comprise a multi-part, substantially tubular housing 5, within which a steering rod 6 is mounted so as to be movable in a longitudinal axial direction, i.e. along its longitudinal axis 7. At each of its two ends, the steering rod 6 is connected to a ball joint (not shown), wherein these ball joints are each in turn used for connection to a wheel steering arm (not shown). The wheel steering arms convert a longitudinal axial movement of the steering rod 6 into a pivoting of steered wheels (not shown) of a motor vehicle.

A longitudinal axial movement of the steering rod 6 is brought about, on the one hand, by the generation of a rotary movement of a steering handle (not shown), in particular of a steering wheel, of the motor vehicle, wherein this rotary movement of the steering handle is transferred via a steering column (not shown) to a steering pinion (not shown). The steering pinion may, to this end, interact with a toothing 8 of the steering rod 6 in order to convert the rotary movement of the steering pinion into a movement in translation of the steering rod 6 along its longitudinal axis 7.

A longitudinal axial movement of the steering rod 6 may further be brought about by the generation of a power steering torque by means of a steering motor 9, which in the present embodiment example is an electric motor. The driving power of the steering motor 9 is for this purpose transferred to the steering rod 6, amongst other things by means of a ball screw drive 10, for which purpose the steering rod 6 in one portion forms a ball recirculation screw thread 11 with thread groove cross section of part-circle design. Multiple spherical transfer elements 12 are arranged within a portion of the ball recirculation screw thread 11, which portion changes during a steering operation, and are additionally received within running grooves of a ball recirculation screw thread, which grooves likewise have cross sections of part-circle design, the ball recirculation screw thread being formed on the inner side of a main body 13 of the transmission nut 4 of the ball screw drive 10. The transmission nut 4 of the ball screw drive 10 is integrated in the housing rotatably, but at the same substantially fixedly or immovably in respect of its longitudinal axial directions, as a result of a corresponding mounting in a bearing assembly. The transmission nut 4 is driven in rotation with intermediate positioning of a further gear stage in the form of a traction drive, which in the shown embodiment example is designed as a belt drive, for which purpose the transmission nut 4 is connected to the first transmission wheel (belt wheel) 1 in a rotationally conjoint or torque-transmitting manner. A belt 14, here in the form of a toothed belt, loops around the first transmission wheel 1 in part, wherein the belt 14 is furthermore guided via a second transmission wheel 15, which is connected in a rotationally conjoint manner to an output shaft 16 of the steering motor 9. Consequently, a rotary movement of the output shaft 16 of the steering motor 9 is transferred via the belt drive to the transmission nut 4 of the ball screw drive 10, wherein a step-down ratio of the rotary speeds is realized (transmission ratio i>1). This rotary movement of the transmission nut 4 is then converted, by the interaction of said nut with the ball recirculation screw thread 11 formed in the outer side of the corresponding portion of the steering rod 6, into a movement in translation of the steering rod 6.

Since, as a movement of the steering rod 6 in a longitudinal axial direction is converted into a pivoting movement of the wheels of the motor vehicle, significant transverse forces may act on the ends of the steering rod 6 via the wheel steering arms, a relatively large potential for a flexural excursion of the ends of the steering rod 6 results in combination with the relatively large distances between the ends of the steering rod 6 and the transmission nut 4, which provides radial support of the steering rod 6, of the ball screw drive 10. Such a flexural excursion may possibly be kept minimal in that the steering rod 6 is additionally supported in the vicinity of the longitudinal axial ends of the housing 5, and is thus supported radially. Nevertheless, a relevant slanted position or a tilting of the steering rod 6 in the region of the transmission nut 4 of the ball screw drive 10 cannot always be avoided.

In order to ensure operation of the ball screw drive 10 with the least possible friction, even with such a slanted position of the steering rod 6 in the region of the transmission nut 4, the transmission nut 4 should likewise be tiltable into a corresponding slanted position. At the same time, however, the longitudinal forces and transverse forces applied to the steering rod 6 must also be supported by means of the mounting of the transmission nut 4 within the housing 5. To this end, the bearing assembly should be mounted within the housing 5 with as little play as possible in the longitudinal axial and also in the radial direction, and the transmission nut 4 should also be received accordingly without play within the bearing assembly.

The bearing assembly to this end comprises the rotary bearing 2 in the form of a single-row four-point contact ball bearing (according to DIN 628), which besides the inner ring 3 also comprises an outer ring 17, with rolling elements 18 in the form of balls arranged between these bearing rings 3, 17, and also a rolling element cage 19. The outer ring 17 of the rotary bearing 2 is directly mounted in a bearing receptacle of the housing 5 and is fixed here axially. The inner ring 3 of the rotary bearing 2 protrudes with one of its axial end portions beyond the outer ring 17 and is connected in a tilt-proof manner by means of this end portion in the steering systems according to FIG. 1 and also according to FIGS. 2 to 4 to the first transmission wheel 1. This tilt-proof connection is realized in the case of the steering system according to FIG. 1 by a securing ring 20, which engages in a circumferential groove of the inner ring 3 of the rotary bearing 2 and also in a circumferential groove of the first transmission wheel 1, and in the case of the steering system according to FIGS. 2 to 4 by means of a threaded connection. By contrast, in the steering system according to FIGS. 5 to 7, the inner ring 3 of the rotary bearing 2 transitions into the first transmission wheel 1 or these two components are formed in one part and also in one piece.

The bearing assembly furthermore comprises a pivot bearing for the transmission nut 4, which pivot bearing is formed by the transmission nut in interaction with the first transmission wheel 1 and possibly also with the inner ring of the rotary bearing 2. To this end, the first transmission wheel 1 is designed as a transmission ring gear, and this has, on its inner side, at least one sub-portion of a joint portion 21 running in a part-spherically curved manner, which joint portion contacts a correspondingly part-spherically curved joint portion 21 of the transmission nut 4 with intermediate positioning of a one-part (see FIG. 1) or two-part (see FIGS. 2 to 7) plain bearing layer 22. The transmission nut 4 is therefore arranged in a first longitudinal portion within the first transmission wheel 1. The transmission nut 4, by contrast, is arranged with a second longitudinal portion within the rotary bearing 2, forming a defined radial play, wherein this radial play is of such a size that, at the pivot angles of the transmission nut 4 to be expected during operation of the steering system, contact between the transmission nut and the inner ring 3 of the rotary bearing 2 is avoided.

In order to ensure that, over the intended service life of the steering system, the joint portion 21 of the transmission nut 4 is mounted with minimal play within the joint portion 21, which is at least also formed by the first transmission wheel 1, this joint portion 21 (amongst other things) of the first transmission wheel 1 is acted on by means of an elastically biased loading device. To this end, this joint portion 21 comprises a first sub-portion 23. This first sub-portion 23, in the steering system according to FIG. 1, is formed by a portion of the inner ring 3 of the rotary bearing 2. In the steering system according to FIGS. 2 to 4, the first sub-portion 23 is, by contrast, formed by the first transmission wheel 1 and, in the steering system according to FIGS. 5 to 7, said first sub-portion is formed by the component combining the first transmission wheel 1 and the inner ring 3 of the rotary bearing 2. The joint portion (amongst other things) of the first transmission wheel 1 furthermore comprises a second sub-portion 24, which is mounted so as to be axially displaceable, within limits, within a main body 25 of the first transmission wheel 1, wherein the biasing force exerted on this second sub-portion 24 by means of the loading device results in principle in a displacement of the second sub-portion 24 in the direction of the first sub-portion 23. Such a displacement of the second sub-portion 24 is then limited in that this sub-portion bears without play against the joint portion 21 of the transmission nut 4, with intermediate positioning of the associated part of the plain bearing layer 22, and in that the joint portion 21 of the transmission nut 4 thus bears without play against the first sub-portion 23 of the joint portion 21 (amongst other things) of the first transmission wheel 1, with intermediate positioning of the other part of the plain bearing layer 22.

As can best be seen in FIGS. 4 and 7, the loading device comprises two ring elements 26 which each have an end face, which end faces are in each case formed in a plurality of (specifically three) portions as slanted faces 27, wherein the slanted faces 27 of the two ring elements 26 contact one another directly, and wherein the ring elements 27 are loaded by means of a plurality of (specifically three) biased spring elements 28 to perform a relative rotation in relation to their longitudinal axes 7. The spring elements in this case have a cylindrical form. They may additionally have a curved longitudinal extent or may be deformable at least in one such curved longitudinal extent, wherein these curvatures may preferably correspond to the radius of curvature of the ring elements 26. The spring elements 28 may thus advantageously be supported, running in the circumferential direction, between shoulders 29 which the two ring elements 26 form in each case at an end of their slanted faces 27, and thus bring about the rotary biasing of the two ring elements 26 relative to one another.

In order to avoid an undesirable shifting of the loading device as a result of forces that are transferred from the steering rod 6 to the transmission nut 4, the slanted faces 27 have gradient angles in relation to a radial plane (radially in relation to the longitudinal axis 7) which are less than 7°, thus resulting in a self-locking effect for the relative rotation between the ring elements 26.

To facilitate the assembly of the steering system, the two ring elements 26 of the already pre-assembled loading device, which is biased by the spring elements 28, are connected to one another by means of a securing element 30. This securing element 30 is released once the loading device has been assembled, thus activating the loading effect of the loading device, by means of which the pivot bearing, which is formed by the transmission nut 4 in interaction with the first transmission wheel 1 and possibly also the inner ring 3 of the rotary bearing 2, is loaded.

To transfer a torque from the first transmission wheel 1 to the transmission nut 4, a coupling is provided, which is formed in combination by an annular circumferential inner toothing 31 of the first transmission wheel 1 and by a likewise annular circumferential outer toothing 32 of the transmission nut, and also by a plastic toothed intermediate ring 33 interacting with both this inner toothing 31 and with this outer toothing 32. The toothed intermediate ring 33 to this end has in each case one complementary toothing on its outer side and also on its inner side. The inner toothing 31 of the first transmission wheel 1 and the outer toothing 32 of the transmission nut 4 are in each case arranged centrally between (the) two sub-portions 23, 24 of the associated joint portion 21 in the longitudinal axial direction. The teeth of all of these toothings are additionally oriented in parallel in relation to the longitudinal axis 7 of the steering rod 6 or of the transmission nut 4. Furthermore, the tooth heads of the outer toothing 32 of the transmission nut 4 have a curved extent so as to form what is known as a curved-tooth coupling, which does not stop the transmission nut 4 from pivoting relative to the first transmission wheel 1 and the rotary bearing 2.

As is provided in the steering systems according to FIG. 1 and according to FIGS. 5 to 7, the toothed intermediate ring 33 may be formed in one part and in particular also in one piece with part of the plain bearing layer 22. In the steering system according to FIGS. 2 to 4, the toothed intermediate ring 33 and also the two parts of the plain bearing layer 22, by contrast, are each embodied as separate components.

LIST OF REFERENCE SIGNS 1 first transmission wheel
2 rotary bearing
3 inner ring of the rotary bearing
4 transmission nut
5 housing
6 steering rod
7 longitudinal axis of the steering rod/the transmission nut/the ring element
8 toothing of the steering rod
9 steering motor
10 ball screw drive
11 ball recirculation screw thread of the steering rod
12 transfer element
13 main body of the transmission nut
14 belt
15 second transmission wheel
16 output shaft of the steering motor
17 outer ring of the rotary bearing
18 rolling body
19 rolling body cage
20 securing ring
21 joint portion
22 plain bearing layer
23 first sub-portion of the joint portion
24 second sub-portion of the joint portion
25 main body of the first transmission wheel
26 ring element of the loading device
27 slanted face of the ring element
28 spring element of the loading device
29 shoulder of the ring element
30 securing element of the loading device
31 inner toothing of the first transmission wheel
32 outer toothing of the transmission nut
33 toothed intermediate ring

The invention claimed is:
1. A steering system comprising:
a steering rod having a longitudinal axis and being mounted displaceably in a longitudinal axial direction in a housing, the steering rod defining a ball recirculation screw thread;
a ball screw drive;
a steering motor, which acts on the steering rod via the ball screw drive and the ball recirculation screw thread;
a transmission nut driven by the steering motor;
spherical transfer elements, via which the ball recirculation screw thread interacts with the transmission nut;
a bearing assembly rotatably mounting the transmission nut in the housing, the bearing assembly having a rotary bearing with an inner ring; and a traction drive configured to transfer driving power of the steering motor to the transmission nut, the traction drive including a transmission wheel attached in a tilt-proof manner to the inner ring of the rotary bearing, wherein:
- the transmission nut is pivotably mounted on the transmission wheel so as to pivot about a pivot axis oriented perpendicularly to the longitudinal axis of the steering rod
- the transmission wheel includes a transmission ring gear,
- the transmission nut has a first curved joint portion which interacts with a second curved joint portion formed at least in part by the transmission wheel so as to form a pivot bearing,
- at least one of the first curved joint portion and the second curved joint portion is elastically loaded in such a way that play-free contact is established between the first and second curved joint portions,
- one or both of the first and second curved joint portions includes a first sub-portion and a second sub-portion, the first sub-portion being displaceable axially in relation to the longitudinal axis of the steering rod relative to the associated second sub-portion, and
- the first sub-portion is loaded by a biased loading device.

2. The steering system as claimed in claim 1, wherein a plain bearing layer is arranged between the first curved joint portion of the transmission nut and the second curved joint portion of the transmission wheel.

3. The steering system as claimed in claim 1, wherein:
the loading device has two ring elements, each of which has an end face formed at least partially as a slanted face,
the slanted faces of the two ring elements contact one another, and
the loading device includes a biased spring element that loads the ring elements to perform a relative rotation.

4. The steering system as claimed in claim 3, wherein the slanted faces have gradient angles in relation to a radial plane that are less than or equal to 7°.

5. The steering system as claimed in claim 1, wherein the transmission wheel is connected to the transmission nut in a torque-transferring manner by a coupling.

6. The steering system as claimed in claim 5, wherein the coupling comprises a toothing, the teeth of which are oriented parallel to the longitudinal axis of the steering rod.

7. The steering system as claimed in claim 6, wherein:
the toothing includes an inner toothing of the transmission wheel and an outer toothing of the transmission nut, and
the coupling further comprises a toothed intermediate ring that interacts with both the inner toothing of the transmission wheel and the outer toothing of the transmission nut.

8. The steering system as claimed in claim 1, wherein:
the transmission wheel is connected to the transmission nut in a torque-transferring manner by a coupling, and
the coupling is arranged between the first sub-portion and the second sub-portion of the one or both of the first and second curved joint portion.

9. The steering system as claimed in claim 1, wherein the transmission nut is arranged with radial play within the inner ring of the rotary bearing.

10. The steering system as claimed in claim 1, wherein the rotary bearing is a single-row ball bearing.

11. The steering system as claimed in claim 1, wherein the rotary bearing is a four-point contact ball bearing.

12. The steering system as claimed in claim 1, wherein the transmission wheel and the inner ring of the rotary bearing are formed in one part or as separate components connected to one another in a tilt-proof manner.

* * * * *